United States Patent [19]

Hundertmark et al.

[11] 4,246,604
[45] Jan. 20, 1981

[54] PIPE INSPECTION APPARATUS

[76] Inventors: Hans W. Hundertmark; Alan E. Davey, both of 81 Payneham Rd., Saint Peters, South Australia, Australia

[21] Appl. No.: 40,280

[22] Filed: May 18, 1979

[30] Foreign Application Priority Data

May 19, 1978 [AU] Australia ............................ PD4438

[51] Int. Cl.³ ............................................. H04N 7/18
[52] U.S. Cl. ..................................... 358/100; 358/229
[58] Field of Search .................. 358/100, 98, 217, 229

[56] References Cited

U.S. PATENT DOCUMENTS 3,499,107 3/1970 Sheldon ................................ 358/98
3,885,091 5/1975 Fish ..................................... 358/100

FOREIGN PATENT DOCUMENTS 1097585 1/1968 United Kingdom ..................... 358/100

Primary Examiner—Howard W. Britton
Attorney, Agent, or Firm—Jay L. Chaskin

[57] ABSTRACT

A television camera, scanner and amplifier all in water proof housings which are close to one another and in tandem. The camera has illuminating lamps coupled to it arranged to illuminate a space forwardly of the lens. An elongate television cable couples the scanner to a television readout screen. The housings are arranged so that they can be moved through a bend or a tee of a standard four inch salt-glazed sewer pipe.

9 Claims, 6 Drawing Figures

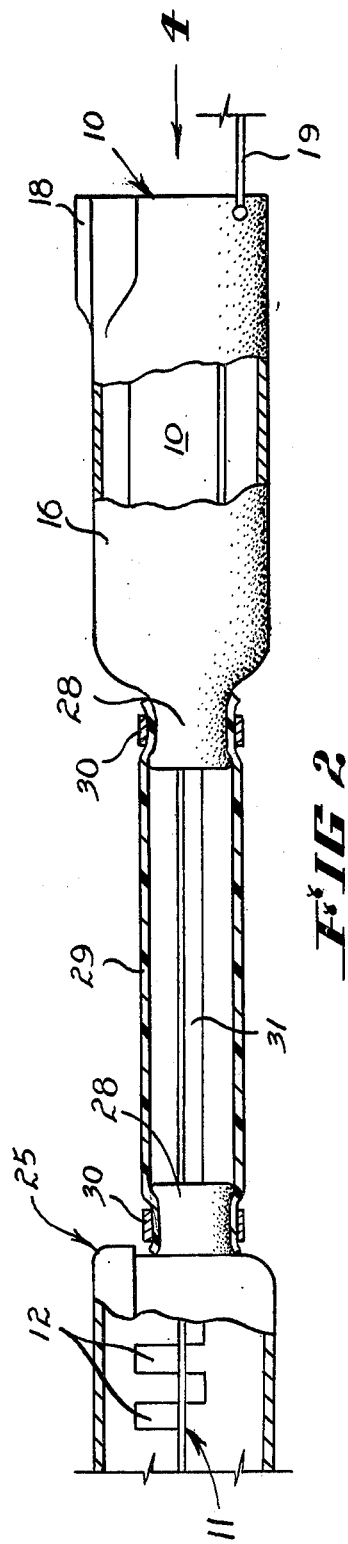
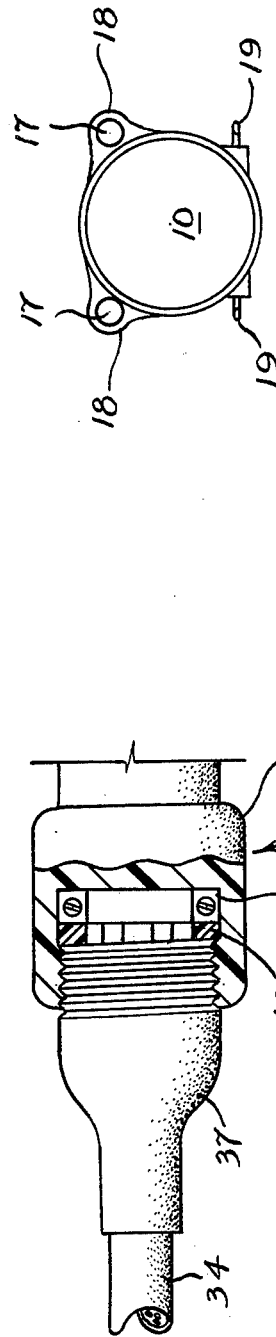

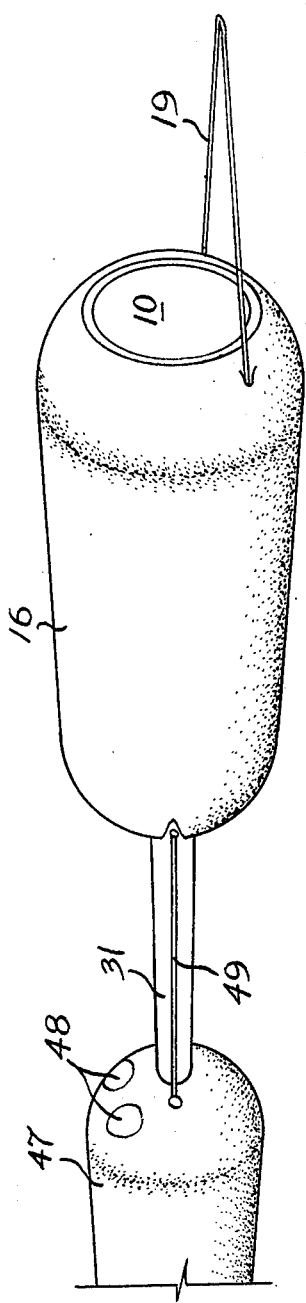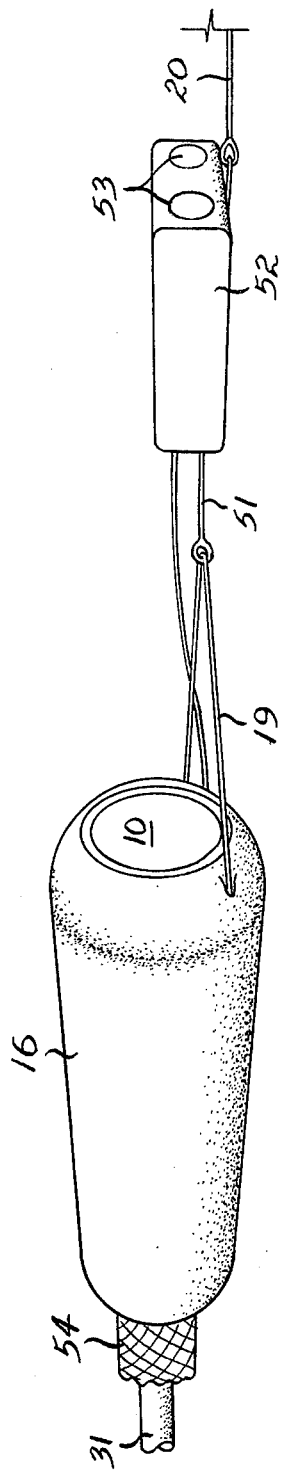

PIPE INSPECTION APPARATUS

This invention relates to an inspection apparatus which can be used (inter alia) for the inspection of pipes of sufficient diameter to accept a closed circuit type television camera.

BACKGROUND OF THE INVENTION

Some drain pipes which are used are salt glazed sewer pipes and have an inside diameter of four inches (100 mm) or thereabouts, and are constructed to a standard. Most television cameras are of such length that they are not able to negotiate standard bends or tees in pipes of this dimension. A television camera has associated with it two separate circuits, namely a scanning circuit and a signalling amplifier circuit, both of which are usually adjacent the television camera. This results in bulky equipment which cannot be used in drain pipes, and to reduce size it has been proposed to locate the signal amplifier above ground level and connect it to the camera and scanning circuit by a co-axial television cable. This must be of sufficient length to allow the camera to be drawn into a drain pipe, and a cable of less than one hundred feet (thirty meters) would be quite inconvenient. However, such a TV cable is not capable of delivering the signals with the required degree of clarity. It is estimated that about 50% of clarity is lost because of this disability.

BRIEF SUMMARY OF THE INVENTION

The invention includes a television camera, scanner and amplifier all in water proof housings which are close to one another and in tandem. The camera has illuminating lamps coupled to it arranged to illuminate a space forwardly of the lens. An elongate television cable couples the scanner to a television readout screen. The housings are arranged so that they can be moved through a bend or a tee of a standard four inch salt-glazed sewer pipe.

More specifically, the invention consists of a television camera, and a waterproof camera housing containing the camera, a scanner having electronic components interconnected in a scanning circuit, and a waterproof scanner housing containing the scanner, an amplifier having electronic components interconnected in an amplifier circuit, and a waterproof amplifier housing containing the amplifier, the shape, cross-sectional size and length of each said housing being such that it can be moved through a bend or tee in a standard four-inch salt-glazed sewer pipe, flexible cables and flexible tension members interconnecting said camera, scanner and amplifier in tandem and closely spaced from one another, illuminating lamps arranged to illuminate a space forwardly of said camera and means coupling the illuminating lamps to the camera, a television readout screen, and an elongate television cable extending from said amplifier to said readout screen.

In most instances the housings are of stainless steel and are interconnected by flexible cables so that each housing is spaced from the next by a distance equal to between one housing length and a half housing length, this being the most suitable length for each housing to pull the next past a bend in a four-inch sewer pipe, or into a pipe line through a tee branch thereof. However, the housing can itself be a flexible wall tube containing the electronic components, and being a "tail" of the camera housing. In some instances it is possible for the scanner housing and the amplifier housing to be a single housing.

The illumination means can be lamps attached to the camera housing, to the scanner housing to shine over and beyond the camera, or to a further housing in front of the camera housing and coupled thereto by a cable.

The cable in being on the output side of the amplifier is capable of delivering a relatively clear image to the television screen. The device therefore becomes useful in the inspection of sewer pipes, drain pipes and the like, but its use can also be extended to other inspection requirements, for example chemical apparatus, sub-terrainian bore holes and the like.

BRIEF DESCRIPTION OF THE DRAWINGS

An embodiment of the invention is described hereunder in some detail with reference to and is illustrated in the accompanying drawings, in which FIG. 2 is an enlarged side elevational view showing the camera housing and portion of the scanner housing, FIG. 3 is an enlarged partly sectional view showing a water proof plug for connecting to the elongate co-axial television cable, FIG. 4 is a front elevation of FIG. 2, FIG. 5 is a fragmentary perspective view according to a second embodiment wherein the illuminating lamps are carried on the scanner housing, and FIG. 6 is a fragmentary perspective view according to a third embodiment wherein the illuminating lamps are carried on a separate lamp housing.

Figure 1:
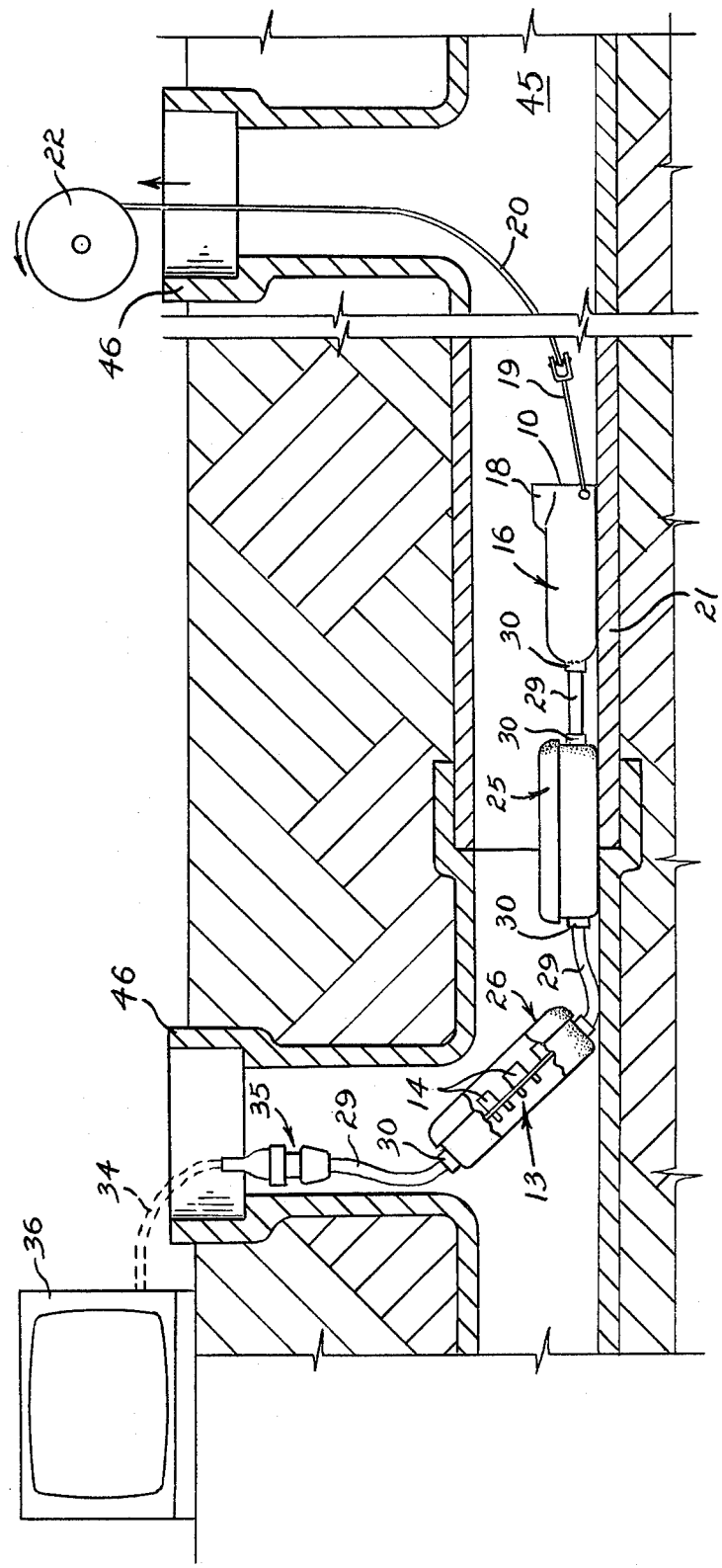
FIG. 1 is a diagrammatic sectional view showing the inspection apparatus in use in a drain pipe line.

In each embodiment use is made of a camera 10 produced by the Japanese manufacturer IKEGAMI, and identified as model CTC-2100. Such a camera includes as standard equipment two electrical component boards, the first being a scanner 11 having electronic components 12 interconnected in a scanning circuit, and the second being an amplifier 13 having electronic components 14 interconnected in an amplifier circuit.

The camera lens, focusing adjustment, and optical sensing apparatus is comprised in a camera housing 16. The camera housing 16 is a substantially cylindrical member having a pair of lamps contained in bosses 18 at its forward end, and the forward end contains a threaded aperture which itself receives a ring having a lens shield thereon, the ring being screwed in against a resilient O ring seal (not herein illustrated). The lamps 17 are arranged to be positioned above and on each side of the vidicon tube, and below the lens there are provided mounting means to which is connected a bridle 19 of a draw cable 20. The draw cable 20 extends through a pipe line 21 and is coupled to a winch 22 which is used for pulling the housing through the pipe line. The draw cable 20 is first located in the pipe line 21 by known means, for example, attaching to a hose having a high pressure water jet as its forward end, used to penetrate a pipe, which may otherwise be blocked.

The scanner 11 is contained within a waterproof scanner housing 25 which is also made of stainless steel, and the amplifier 13 is contained within a waterproof amplifier housing 26, again made of stainless steel.

As shown best in FIG. 2, the rear end of the camera housing 16 is provided with a "tail" 28, and each end of the scanner housing 25 is also provided with a "tail", and these tails have secured to them the ends of a relatively small diameter flexible tube 29, clamped in place by clamps 30. The tube 29 functions as a tension member so that as the draw cable 29 pulls the camera housing 16 through the pipe line 21, the tension extends to the housings 25 and 26. A flexible multicored electrical cable 31 interconnects the camera 10 and the electrical components 12 of the scanner, and the same arrangement interconnects the electrical components 14 of the amplifier.

An elongate coaxial television cable 34 is connected by a plug assembly 35 to the amplifier 13, and joins the amplifier 13 to a television monitor tube 36. The plug assembly 35 is shown in FIG. 3 and includes a third male portion 37 threadably engaged by a nut 38 and a sealing ring 39 and spacer 40 interposed between the elements effect a water seal.

In this embodiment the three housings are independent from one another, and the length of the two joining cables 29 is about three-quarters of the length of any one of the housings, this being found to be a convenient length which facilitates movement of the housings passing through a bend or through the branch pipe of a tee of a standard four-inch salt-glazed sewer pipe. As said above, in some other embodiments the scanner and amplifier can be contained in a flexible tube joined as a "tail" to the camera housing 16, or both can be contained within a single housing, but neither arrangement is described herein.

As shown in FIG. 1, the pipe line 21 is provided with two standard tees 44 and 45 with upstanding branches 46 known as "inspection pipes". The train of housings 16, 25 and 26 can be easily fed into the pipe line 21 through such inspection pipes.

The second embodiment of FIG. 5 is similar to the first, excepting that the scanner housing (in FIG. 5 designated 47) is a bullet-nose housing and contains two lamps 48 which will shine past the camera housing 16 and illuminate the pipe in front of the camera 10. Another slight variation illustrated in FIG. 5 is the use of stainless steel tension wires 49 in lieu of the flexible tube 29, the wires 49 being located one on each side of the flexible cable 31.

The third embodiment of FIG. 6 is varied slightly, in that the bridle 19 is coupled by a cable 51 to a lamp housing 52 disposed forwardly of the camera housing 16 and containing two lamps 53 for illuminating the interior wall of the pipe line 21. The cable 31 is contained within a stainless steel bordered tube 54 which functions as a tension member and takes the place of the tension member 29.

It has been found that the results achieved provide a much clearer image on the television screen than can be achieved by a prior art type device, and the device is useful in many circumstances where prior art cameras cannot be inserted because of their bulk.

The above embodiment has been described with respect to a four-inch salt-glazed sewer pipe. Clearly the embodiment is equally applicable to drain pipes made from plastics or other materials, wherein the interior dimensions and shapes are similar. Various modifications in structure and/or function may be made by one skilled in the art to the disclosed embodiments without departing from the scope of the invention as defined by the claims.

We claim:

1. Closed circuit television inspection apparatus useable for pipe inspection comprising:
   a television camera, illuminating means for illuminating a space forwardly of the camera, and a water-proof housing containing the camera and illuminating means;
   a scanner having electronic components interconnected in a scanning circuit, and a water-proof scanner housing containing the scanner,
   an amplifier having electronic components interconnected in an amplifier circuit, and a water-proof amplifier housing containing the amplifier,
   the shape, cross-sectional size and length of each said housing being such that it can be moved through a bend or tee of the pipe,
   flexible cables and flexible tension members interconnecting said camera, scanner and amplifier and their respective housings in tandem and closely spaced from one another, and
   a television readout screen, and an elongate television cable extending from said amplifier to said readout screen.

2. Closed circuit television inspection apparatus according to claim 1 wherein each said housing comprises stainless steel.

3. Closed circuit television inspection apparatus according to claim 1 wherein each said tension member is a flexible plastics tube surrounding a respective one of said flexible cables.

4. Closed circuit television inspection apparatus according to claim 1 wherein each said tension member is a flexible tube of braided metal surrounding a respective one of said flexible cables.

5. Closed circuit television inspection apparatus according to claim 1 wherein each said tension member is a flexible wire extending between a pair of said housings.

6. Closed circuit television inspection apparatus according to claim 1 wherein said camera housing comprises bosses and said lamps are contained in said bosses.

7. Closed circuit television inspection apparatus according to claim 1 further comprising a draw cable, and means connecting one end of the draw cable to the camera housing.

8. Closed circuit television inspection apparatus according to claim 1 wherein each said housing is spaced from the adjacent housing by a distance equal to between one housing length and a half housing length.

9. Closed circuit television inspection apparatus according to claim 1 wherein each said tension member has a length of about three-quarters of the length of any one of the housings.

* * * * *